United States Patent [19]

Karubian

[11] Patent Number: 4,901,400
[45] Date of Patent: Feb. 20, 1990

[54] DE-HIDING TOOL

[76] Inventor: Ralph K. Karubian, 7100 So. Avalon Blvd., Los Angeles, Calif. 90003

[21] Appl. No.: 302,619

[22] Filed: Jan. 27, 1989

[51] Int. Cl.$^4$ .................................................. A22B 5/16
[52] U.S. Cl. ............................................. 17/21; 17/50; 30/173
[58] Field of Search ................... 17/21, 62, 67, 52, 50; 30/173, 265

[56] References Cited

U.S. PATENT DOCUMENTS

| | | | |
|---|---|---|---|
| 1,506,510 | 8/1924 | Thuau | 17/21 |
| 2,547,134 | 4/1951 | McLean | 17/21 |
| 2,974,413 | 3/1961 | Williams | 17/21 |

FOREIGN PATENT DOCUMENTS

| | | | |
|---|---|---|---|
| 549411 | 11/1957 | Canada | 17/21 |
| 1154372 | 9/1963 | Fed. Rep. of Germany | 17/21 |
| 539686 | 1/1956 | France | 17/21 |
| 1321829 | 2/1963 | France | 17/21 |
| 609236 | 9/1948 | United Kingdom | 17/21 |

*Primary Examiner*—Willis Little
*Attorney, Agent, or Firm*—Bruce L. Birchard

[57] ABSTRACT

A de-hiding tool for use in slaughter houses in which a spring biases the reciprocating cutting blades into intimate facial contact to prevent debris from entering the driving mechanism, but achieves long life and low maintenance by interposing a low-friction element between the biasing spring and the nearest cutting-blade face, such element and the spring being carried in one cover of the tool coaxially with the cutting blades, the low-friction element being movable towards the nearest cutting-blade face under pressure from said spring, the tool being capable of adjustment to optimum operational speed by reason of an adjustable needle valve carried in the air channel to the tool.

11 Claims, 2 Drawing Sheets

DE-HIDING TOOL

BACKGROUND OF THE INVENTION

1. Field of the Invention

This invention relates to equipment for use in slaughterhouses and, more specifically, to a tool for the separation of the hide of an animal from the associated carcass by severing the membranes connecting such hide and the flesh of the carcass.

2. Prior Art

Tools for de-hiding carcasses are, broadly, not new, for example, see U.S. Pat. No. 3,857,177 issued to this inventor. Other patents covering de-hiding tools are U.S. Pat. No. 3,435,522, issued Apr. 1, 1969, U.S. Pat. Ser. Nos. 4,368,560 and 3,570,120, issued Mar. 16, 1971 to Wetzel. In general, these tools have oppositely reciprocating blades, usually toothed. The blades are driven by an air motor at very high speeds equivalent to approximately 6500 rpm. To minimize the amount of waste material that tends to collect between the blades causing the tool to be unsanitary and inefficient, the blades are put under pressure by a wave spring which presses on one of the blades causing it to engage the other blade. As these blades reciprocate in opposite directions, each to the other, there is friction and wear on the wave spring which rides on the outer face of one of the blades. The wave spring becomes worn and fails rapidly under the high speed operating conditions that exist. Replacement of the wave spring is expensive and time consuming and, with the devices of the prior art, must occur quite frequently.

Another characteristic of such air driven de-hiding tools is that the speed of blade reciprocation varies widely along the distribution line of the compressed air which operates these tools. Also, an individual tool may exhibit less than optimum operating speed as a result of internal friction. The operator becomes less efficient and more fatigued and the production line suffers if the speed of the tool is too slow. Tearing of the hide may result so that not only is the output of each operator down but the quality of the production is also seriously reduced.

It is an object of this invention to overcome the various difficulties of the prior art tools.

It is a further object of this invention to provide a de-hiding tool which has minimum breakdowns and long time periods between disassembly for maintenance purposes.

It is a further object of this invention to provide a de-hiding tool in which each operator may adjust the speed of his de-hiding tool to the optimum point for the de-hiding operation in a convenient and efficient manner.

SUMMARY OF THE INVENTION

By providing a removable Teflon insert between the blade-pressuring wave spring and the proximate blade in the cutting pair, wear of the wave spring is materially reduced resulting in less down-time for maintenance of the tool and reduced cost. Further, by providing an adjustable control valve in the air passage to the air motor in the tool, the speed of the individual de-hiding tool may be adjusted to its optimum value by using a tachometer on the tool while it is in operation.

BRIEF DESCRIPTION OF THE DRAWINGS

This invention in the manner in which it constitutes improvement over prior art de-hiding tools can best be understood by referring to the specification which follows in combination with the drawings herein in which:

FIG. 1A is an exploded view of the de-hiding tool of FIG. 1; and

DETAILED DESCRIPTION OF THE PREFERRED EMBODIMENT

Figure 1:
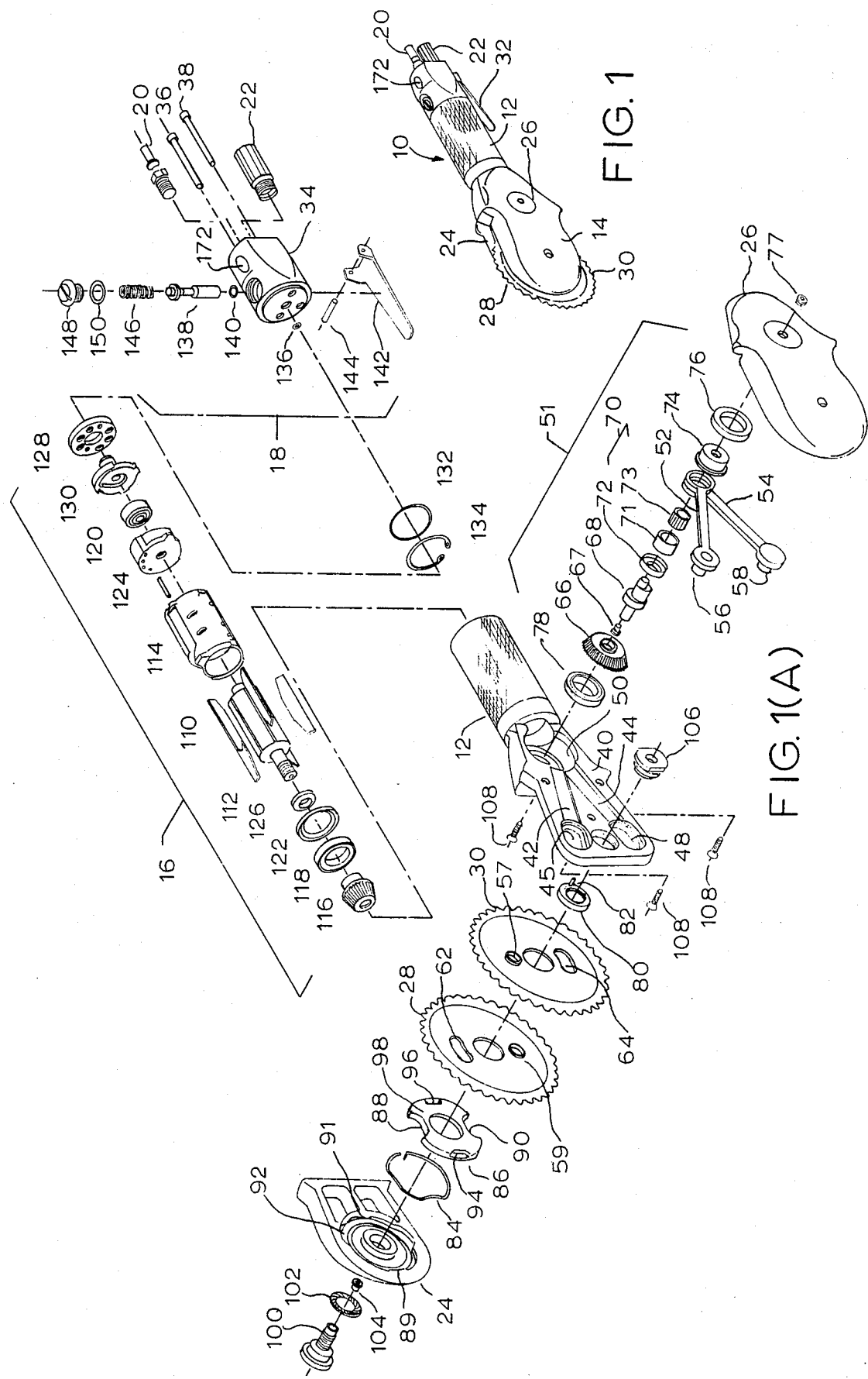
FIG. 1 is a perspective, assembly view of a de-hiding tool according to the present invention.

In FIG. 1, tool 10 has a handle portion 12 and a cutting portion 14 which is joined to handle 12 and may be, at least in part, integral therewith. Handle 12 encloses the air motor portion 16, not shown in FIG. 1 but shown in detail in FIG. 1A and valve body assembly 18, not shown in FIG. 1 but also shown in detail in FIG. 1A. Valve body assembly 18 carries at its outer end air input coupler 20 and air escape muffler 22.

Cutting portion 14 includes a pair of side covers 24 and 26 and a pair of tooth cutting blades 28 and 30 which are carried within and covered by covers 24 and 26, except in the toothed regions of each of the cutting blades 28 and 30. Valve lever 32 is the "on-off" control for tool 10.

Turning to FIG. 1A, valve body 34 is attached to handle portion 12 by means of a pair of screws 36, 38. Handle portion 12 may be an integral part of frame 40. Frame 40 has a pair of grooves 42, 44, therein. Groove 42 terminates, at one end in opening 46. Groove 44 terminates at one end in opening 48. At the opposite end of each of the grooves is transmission opening 50.

Transmission opening 50 receives eccentric shaft assembly 51 which includes long pin drive link or link arm 52 and short pin drive link or link arm 54 which is carried on needle bearing 70 comprising outer shell 71 and inner element 73. Spacer 74 and roller bearing 76 space drive links 52 and 54 from supporting cover 26. Needle bearing spacer 72 spaces needle bearing 70 from a portion of eccentric shaft 68 which has a grease fitting 67. Eccentric shaft 68, which carries drive links or link arms 52 and 54, is driven by bevel gear 66 which, in turn, is rotatably supported by ballbearing 78. Thus, the entire eccentric assembly which carries the driving mechanism 51 is supported, for reciprocation of drive links or link arms 52 and 54, at one end by frame 40 and at the other end by cover 26. For longer, care-free operation of tool 10, element 73 may be a simple bushing made of Torlon, a high performance polymer [poly amide-imide)] material manufactured by Amoco Performance Products, Inc.

In operation, pins 56 and 58 on drive links or link arms 52 and 54, respectively, reciprocate within openings 46 and 48, respectively. Pin 56 on drive link or link arm 52 fits rotatably into journal 57 carried by toothed cutting blade 30. Journal 57 may extend into slot 62 in toothed cutting blade 28. Pin 58 on drive link or link arm 54 extends through slot 64 in toothed cutting blade 30 and into journal 59 on cutting blade 28 to drive, in reciprocating fashion, toothed cutting blade 28.

Toothed cutting blades 28 and 30 ride on bearing surface 80 which carries locating pin 82. Locating pin 82 prevents rotation of bearing surface 80 during reciprocation of blades 28 and 30.

To prevent debris from the cutting process from entering between the two opposing blades, it is essential that the opposing faces of cutting blades 28 and 30 be in intimate contact with each other. In conventional de-hiding tools, this end is accomplished by simply providing a wave spring, such as wave spring 84 in FIG. 1A. Wave spring 84 is held within grooves in cover 24. Unfortunately, if there is direct contact between wave spring 84 and the opposing face of cutting blade 28, wave spring 84 wears rapidly at the approximately 6500 strokes per minute speed at which the machine operates. Thus, wave spring 84 would normally have to be replaced frequently in conventional machines. However, this inventor has provided an additional element, low-friction insert 86, which may be of Teflon or similar low-friction plastic material. Insert 86 has cut-outs 88 and 90, which cooperate with tabs 89 and 91 in cover 24 in the process of inserting low-friction disk 86 into slot 92. The thickness of low-friction disk 86 is less than the space between the back wall of slot 92 and the inner side of tabs 89 and 91 so that, against the pressure of wave spring 84, insert or disk 86 may be pressed into the slot with cutouts 88 and 90 aligned with tabs 89 and 91 and disk 86 may then be rotated until recesses 94 and 96 are aligned with tab 89 and 91, at which time release of disk 86 will permit wave spring 84 to press disk 86 outwardly towards and locked into pressured engagement with the contiguous face of cutting blade 28 forcing it, in turn, into tight but sliding contact with the contiguous face of cutting blade 30. Thus, the frictional forces produced as a result of the interposition of low-friction disk 86 between wave spring 84 and cutting blade 28 will fall on the surface 98 of Teflon element 86, which may be easily be replaced, as needed without any tools. Down time of the tool is greatly reduced by this construction. Cover lock screw 100, lock washer 102 and grease fitting 104 complete the mechanical structure at one end of the cutting-disk-supporting structure and insert 106, which screws into frame 40 and supports bearing ring and blades spacer 80, completes the cutting mechanism support at the remaining end. Screws 108 secure cover 26 to frame 40.

Power for cutting-blades 28 and 30 is provided by means of air motor and gear assembly 16 which comprises air motor vanes 110 carried on rotor 112 within housing 114. Pinion gear 116 is affixed to rotor 112 and rotates therewith. Ball bearings 118 and 120 provide rotational support for rotor 112. The air motor is provided with a front plate 122 and an end cap 124. A spacer ring 126 is provided to properly position rotor 112 with respect to motor front plate 122. Air supply ring 128 permits introduction of air into the air motor through lock ring 130.

Valve body assembly 18 is coupled to air motor assembly 16 by means of an "O" ring 132 and a retaining "C" ring 134. An additional "O" ring 136 is provided between valve body assembly 18 and air motor and gear assembly 16. Valve body assembly 34 receives valve stem 138 which extends below the bottom of valve body 34 for engagement by valve lever 142. Valve lever 142 rotates, in limited fashion, around shaft 144 which, in turn, is supported from valve body 34. Valve stem 138 is urged downwardly by spring 146 which is compressed by a combination of valve plug 148 and "O" ring 150. Upward movement of valve lever 142 opens the path of flow of air from inlet 20.

Figure 2:
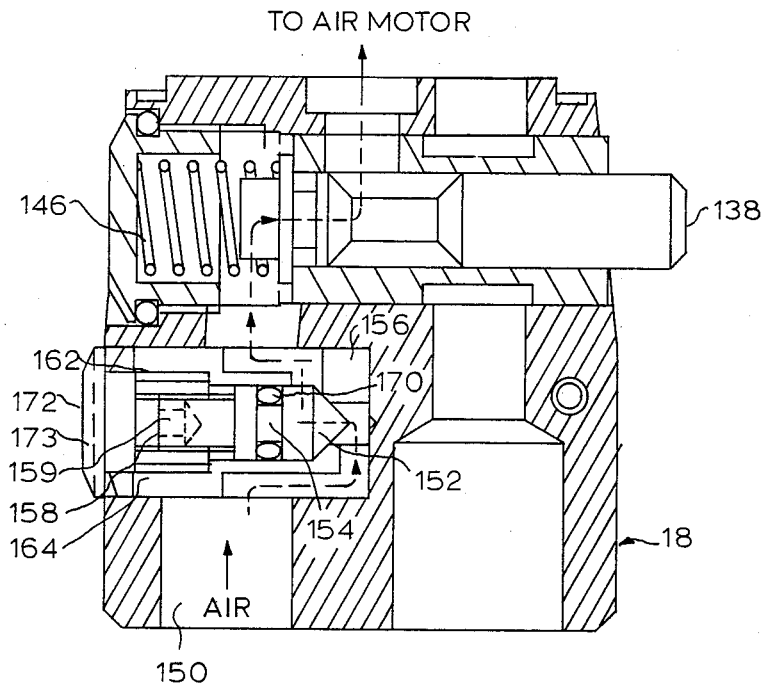
FIG. 2 is partially cross-sectioned view of a modified portion of the de-hiding tool of FIGS. 1 and 1A.

Turning to FIG. 2, air from input coupler 20 (FIG. 1), passes into input port 150, and into speed control valve assembly 152. Speed control valve assembly 152 includes valve stem 154 which is urged towards seat 156 by half-dog set screw 158, which may have an Allen-head socket in its head 159. Half-dog set screw 158 is threaded about its circumference and those threads engage internal threads 162 in brass insert 164 to make the position of half-dog set screw 158 adjustable. As half-dog set screw 158 is adjusted the position of valve stem 154 is adjusted with respect to seat 156 because the pressurized air flowing in through port 150 pushes valve stem 154 against half-dog set screw 158, that is, away from seat 156. Leakage of compressed air around valve stem 154 is prevented by "O"-ring 170. Cap 172 carries threads (which cooperate with threads 162) and slot 173, the latter being adapted to receive a flat-blade screw driver for insertion and removal of cap 172. To prevent accidental escape of valve stem 154 when cap 172 and half-dog set screw 158 are removed, snap ring 174 is provided.

The output air from speed control valve assembly 152 flows to the "on-off" valve assembly 18 and hence to air motor and gear assembly 16. Thus speed control is achieved by speed control valve assembly 152 and the "on-off" control of the tool is achieved by force placed upon valve stem 138 by valve lever 142 shown in FIG. 1A. Thus, an individual operator may adjust the speed of his tool, at any time, to the desired optimum speed by turning half-dog set screw 158 until speed control valve assembly 152 is opened to the desired degree.

While particular embodiments of my invention have been shown and described, it will be apparent to those ordinarily skilled in the art that variations and modifications may be made therein without departing from the true spirit and scope of this invention. It is the intention of the appended claims to cover all such variations and modifications.

I claim:

1. A de-hiding tool, including:
   a frame portion having first and second opposed faces;
   a hollow handle portion coupled to said frame portion;
   a tool-control valve portion coupled to said handle portion;
   an air motor carried in said hollow handle portion and coupled, pneumatically, to said tool-control valve portion;
   said air motor having a rotor;
   a pinion gear carried by said rotor in coaxial relationship thereto;
   blade-bearing means carried by said frame in said first face thereof;
   first and second toothed blades carried by said blade-bearing means, said first toothed blade being proximate to said first face of said frame;
   a wave spring;
   a low-friction insert;
   first cover means for covering said first face of said frame;
   said first cover means including a recess for receiving said wave spring and said low friction insert, said wave spring being positioned to bias said low-friction insert towards said first face of said frame;
   said low-friction insert, when said first cover is attached to said frame, forcefully engaging said second toothed blade which, in turn, becomes contiguous with said first toothed blade, whereby space between said first and second toothed blades is eliminated; and, drive means coupled to said pinion gear for driving said first and second blades in oppositely reciprocating directions.

2. Apparatus according to claim 1 in which said drive means includes first and second eccentric-shaft-driven drive links coupled to said first and second toothed blades, respectively.

3. Apparatus according to claim 2 in which said first and second drive links move in grooves in said second face of said frame.

4. Apparatus according to claim 1 in which said tool-control valve portion includes a speed control valve.

5. Apparatus according to claim 4 in which said tool-control valve portion includes an air channel for the passage of air and said speed control valve is carried in said air channel and is adjustable.

6. Apparatus according to claim 5 in which said control valve portion includes, in addition, a tool "on-off" valve.

7. Apparatus according to claim 1 in which said handle portion and said frame portion are integral.

8. Apparatus according to claim 1 in which said drive means includes a bevel gear mechanically coupled to said pinion gear on said rotor of said air motor.

9. Apparatus according to claim 1 in which said drive means are supported, in part, by a second cover attachable to said second face of said frame.

10. Apparatus according to claim 1 in which said drive means includes, in addition, a bevel gear coupled to said pinion gear, an eccentric shaft coupled to said bevel gear and driven thereby and first and second drive links carried by said eccentric shaft and caused to reciprocate thereby, said first and second drive links being mechanically coupled to said first and second blades, respectively.

11. Apparatus according to claim 1 in which said drive means includes a pair of link arms carried on a bushing of Torlon.

* * * * *